United States Patent Office 2,865,891
Patented Dec. 23, 1958

2,865,891

LINEAR COPOLYESTERS AND PROCESS

Rudolph Henry Michel, Kenmore, N. Y., assignor to E. I. du Pont de Nemours and Company, Wilmington, Del., a corporation of Delaware No Drawing. Application September 24, 1953
Serial No. 382,219

5 Claims. (Cl. 260—75)

This invention relates to linear polyesters and, more particularly, to linear copolyesters prepared from glycols and phthalic acids and to films and fibers of said linear copolyesters.

The production of the novel class of fiber- and film-forming linear polyesters of terephthalic acid and a glycol of the series $HO(CH_2)_nOH$ where "$n$" is an integer from 2 to 10 inclusive is fully disclosed in U. S. P. 2,465,319. From a commercial standpoint, one of the most interesting polymers of this class is polyethylene terephthalate. For use in certain applications, for example, as a glass replacement in storm windows and windshields, transparent containers, protective coverings, sound recording discs and tapes, etc., the relatively high tensile modulus of polyethylene terephthalate film is advantageous. On the other hand, the high tensile modulus of this film is disadvantageous for employing the unsupported film as a fabric replacement, for example, in draperies, shower curtains, rainwear, table cloths, furniture slip covers, automobile seat covers, etc. By the same token, polyethylene terephthalate is not generally satisfactory for use as a binder for impregnation of nonwoven fibrous mats, composites of polymeric binders and fibrous mats also being employed as a woven fabric replacement. An object of the present invention is the preparation of a modified polyethylene terephthalate having a relatively low tensile modulus, i. e., low bending stiffness. A further object of the present invention is to prepare a copolymer of polyethylene terephthalate which may be fabricated into films or filaments having a relatively low tensile modulus or bending stiffness. A still further object of the present invention is to prepare a polyethylene terephthalate copolymer which may be formed into a film having a high water vapor permeability. Other objects will be apparent from the description of the invention to follow.

The above objects are accomplished by the present invention which, briefly stated, comprises reacting ethylene glycol, terephthalic acid or a low alkyl ester thereof, isophthalic acid or a low alkyl ester thereof, and a polyethylene glycol under ester-forming conditions to form a mixed ester and thereafter polymerizing said mixed ester to form a copolyester.

The polyethylene glycol may be any of the compounds defined by the formula:

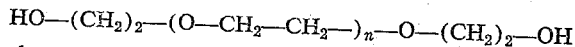

where "$n$" is an integer. The polyethylene glycol may have a single molecular weight; it may be a blend of a low and a high molecular weight compound; or it may be a blend of several compounds of graduating molecular weight. It is preferred, however, that the polyethylene glycol be a pure polymer or mixture of such polymers having a relatively narrow range of molecular weights within the molecular weight range of from about 1000 to about 4000.

To produce a linear polyester having a relatively low tensile modulus within an optimum range, the original reaction mixture should comprise from 40%–70% by weight of a polyethylene glycol, based on the total weight of the polyethylene glycol, terephthalic acid or low alkyl ester thereof (having from 1 to 7 carbon atoms in the alkyl group), and isophthalic acid or low alkyl ester thereof; from 30% to 60% by weight of a mixture of terephthalic acid or low alkyl ester thereof; and isophthalic acid or a low alkyl ester thereof, the weight percent of terephthalic acid or low alkyl ester thereof based on the total weight of the two acids or lower alkyl esters thereof being from 50% to 95%; and from 1.5 to 5 mols of ethylene glycol per mol of acids or low alkyl esters employed. Preferably, the initial reaction mixture should contain from 40% to 50% by weight of a polyethylene glycol having an average molecular weight of about 1000; from 60% to 50% by weight of a mixture of terephthalic and isophthalic acids or low alkyl esters thereof, the weight percent of the terephthalic acid or ester of said mixture being within the range of from 85%–95% of the total weight of acids or esters; and about 2.5 mols of ethylene glycol per mol of mixed acids or esters. In another preferred embodiment, the initial reaction mixture comprises from 40%–65% of a polyethylene glycol having an average molecular weight of about 1540; from 60%–35% of the mixed acids or lower alkyl esters thereof wherein the terephthalic acid or ester constitutes from 75%–95% by weight of the total weight of the mixture; and about 2.5 mols of ethylene glycol per mol of mixed acids or esters. In still another preferred embodiment, from 40%–70% of a polyethylene glycol having an average molecular weight of about 4000 is reacted with from 60%–30% of mixed acids or lower alkyl esters wherein the terephthalic acid or ester constitutes from 50%–95% of the total weight of the mixture, and about 2.5 mols of ethylene glycol per mol of mixed acids or esters.

The ester-forming or ester interchange reaction and the polymerization reaction may be carried out essentially as described in U. S. P. 2,534,028 to E. F. Izard. For example, the ester interchange reaction is brought about in the presence of a catalyst, e. g., litharge in a concentration ranging from 0.005% up to 1%, based upon the combined weight of the acids or esters thereof, by heating the ingredients in a vessel adapted for distillation at a temperature between 140° C. and 230° C., and preferably between 200° C. and 230° C. Obviously, other ester interchange catalysts may be employed, for example, those disclosed in U. S. P. 2,465,319. The ester interchange reaction may be carried out under pressures above or below atmospheric pressure if desired. The volatile product of the reaction, for example, methanol in the case of reacting dimethyl terephthalate and dimethyl isophthalate, is removed from the reaction vessel; and this forces the ester interchange reaction to completion.

The subsequent polymerization reaction may be effected in either the liquid, i. e., the melt, or solid phase. In the liquid phase, the reaction is carried out at reduced pressure in the vicinity of 0.05 to 20 mm. of mercury with the range 0.05 to 5.0 mm. of mercury preferred for optimum results. At this reduced pressure, the free ethylene glycol which emerges from the polymer as the result of the condensation reaction is removed. If reduced pressure is not used, all the ethylene glycol will not be removed; and it will not be possible to form a fiber- or film-forming polymeric material, but rather a low molecular weight polymer, too brittle for fibers or films. A temperature between about 230° C. to about 290° C., and preferably between about 260° C. and about 275° C., should be maintained during the polymerization step. Since low temperatures necessitate an excessive length of time, the higher temperatures within the preferred range will generally be used in commercial operations. Litharge may be used as the polymerization catalyst although any other suitable polymerization catalysts may be employed, for example, those indicated in the following examples.

The copolyesters may be formed into films and filaments by the usual extrusion, molding, casting, etc., techniques; and the resulting structures may be further processed, as by drawings, heat-setting, etc., to modify the properties thereof in accordance with the use to which they are to be put.

The following examples further illustrate the preparation of the linear copolyesters of the present invention. Parts are by weight unless otherwise indicated:

EXAMPLE 1

Into a glass vessel equipped with a side arm take-off were placed twenty parts of a polyethylene glycol having an average molecular weight of 4000. A bleed tube was introduced into the vessel. The vessel was evacuated to less than 1 mm. of mercury pressure and heated to 174° C.–176° C. while nitrogen was allowed to bubble through the melt. After one hour, the vessel was flushed with nitrogen, the bleed tube was removed, and the melt allowed to cool. A mixture of 15 parts of dimethyl terephthalate, 5 parts of dimethyl isophthalate, 0.03 part of calcium acetate, 0.01 part of antimony trioxide, and 16 parts of ethylene glycol was added to the glass vessel. The vessel was closed, and the mixture heated to 218° C.–223° C. while methanol was evolved through the side arm of the vessel. After four hours of heating, a bleed tube was inserted into the vessel. The vessel was heated to 263° C.–265° C. for one hour; and after that time the bleed tube was connected to a supply of nitrogen, and the side arm of the vessel was connected to a vacuum line via an air-cooled trap. During the next 45 minutes, the pressure was reduced to 0.3 mm. of mercury; and the vessel was held under this reduced pressure at 263° C.–265° C. for 3½ hours in order to complete polymerization.

EXAMPLE 2

The reaction procedure described in Example 1 was followed except that 20 parts of a polyethylene glycol having an average molecular weight of 1540 were initially added to the reaction vessel. Thereafter, a mixture of 17 parts of dimethyl terephthalate, 3 parts of dimethyl isophthalate, 0.03 part of calcium acetate, 0.01 part of antimony trioxide, and 16 parts of ethylene glycol were added to the vessel. Ester interchange and polymerization were carried out under the same conditions described in Example 1.

EXAMPLE 3

The reaction conditions were substantially the same as those described in Example 1 except that initially 20 parts of a polyethylene glycol having an average molecular weight of 1000 were added to the vessel. Thereafter, a mixture of 17 parts of dimethyl terephthalate, 3 parts of dimethyl isophthalate, 0.03 part of calcium acetate, 0.01 part of antimony trioxide, and 16 parts of ethylene glycol were added to the vessel. The ester interchange and polymerization conditions were substantially the same as those described in Example 1.

The polymers prepared in accordance with the foregoing examples were formed into film by pressing the polymer in a press at temperatures of 20° C.–40° C. above the stick temperature of the polymer and using pressures of 5,000–10,000 lbs. The "stick" temperature is substantially the same as the melt temperature of the polymer which is the minimum temperature at which a sample of the polymer leaves a wet molten trail as it is stroked with moderate pressure across a smooth surface of a heated block of brass. For each of these films, the following physical properties were measured: stick temperature, initial tensile modulus, tensile strength, and elongation. Initial tensile modulus, which is the ratio of stress to strain of the initial straight line portion of the stress-strain curve, is a measure of bending stiffness.

Table I presents a comparison of certain physical properties of films of copolyesters of the present invention with the same physical properties of films of polyethylene terephthalate and copolyesters prepared by reacting ethylene glycol, terephthalic acid or a low alkyl ester thereof, and a polyethylene glycol. Modification of polyethylene terephthalate with a polyethylene glycol results in the formation of a polyester of substantially lower tensile modulus as measured on films thereof. However, to lower the tensile modulus of the polyester film to the extent required for a good fabric replacement film, that is, by the addition of larger quantities of a polyethylene glycol to the initial reactants, results ultimately in the formation of a polyester film which has inadequate tensile strength. On the other hand, the copolyesters of the present invention may be formed into film having a low tensile modulus without sacrifice in tensile strength. Table I shows these comparisons.

*Table I*

PHYSICAL PROPERTIES OF ETHYLENE TEREPHTHALATE-ETHYLENE ISOPHTHALATE POLYETHYLENE GLYCOL COPOLYMER FILMS

| Composition | Stick Temp., °C. | Initial Tensile Modulus (p. s. i.) | Tensile Strength (p. s. i.) | Elongation, percent | Tear Strength, grams/mil |
|---|---|---|---|---|---|
| PEG 4000/2GT 50/50 [1] | 225 | 6,073 | 1,565 | 258 | |
| PEG 4000/2GT/2GI 50/37.5/12.5 [2] | 123 | 2,786 | 1,734 | 1,013 | 18 |
| PEG 1540/2GT 50/50 | 181 | 7,556 | 1,377 | 252 | |
| PEG 1540/2GT/2GI 50/42.5/7.5 | 140–145 | 4,223 | 1,587 | 871 | |
| PEG 1000/2GT 50/50 | 171 | 6,597 | 1,591 | 316 | |
| PEG 1000/2GT/2GI 50/42.5/7.5 | 115–120 | 4,186 | 1,477 | 905 | 8.3 |
| Polyethylene Terephthalate (unstretched) | 248–250 | 300,000 | 8,000 | 500 | 40 |

[1] PEG 4000/2GT (50/50)—a copolymer prepared from a mixture of ethylene glycol, a polyethylene glycol having an average molecular weight of 4000, and dimethylterephthalate containing the last two components in a weight ratio of 50/50.
[2] PEG 4000/2GT/2GI (50/42.5/7.5)—a copolymer prepared from a mixture of ethylene glycol, a polyethylene glycol having an average molecular weight of 4000, dimethyl terephthalate and dimethyl isophthalate containing the last three components in weight-ratio of 50/37.5/12.5.

Films of the copolyesters of the present invention are characterized by having a high permeability to water vapor as measured in terms of "leather permeability values" (LPV). The leather permeability values are in the vicinity of 10,000–35,000 grams/100 square meters/hour per mil. These values compare favorably with shoe upper leathers which exhibit leather permeability values within the range 2,000–22,000 grams/100 square meters/hour. Polyethylene terephathalate film has an LPV in the vicinity of 25. These leather permeability values represent measures of the water vapor permeability of the films. These data are in units of grams of water per 100 square meters per hour and were obtained in tests carried out in accordance with the method of Kanagy and Vickers (Journal of American Leather Chemists Association, 45, 211–242, April 1950).

Films prepared from the copolyesters of the present invention are particularly adapted for use in the fabric replacement field, for example, in draperies, shower curtains, rainwear, table cloths, furniture slip covers, automobile seat covers, etc. The films may be employed in unsupported form or the copolyesters may be employed as a binder polymer in fiber-reinforced films. That is, non-woven fibrous mats of nylon fibers, or other types of synthetic fibers such as polyacrylonitrile, polyethylene terephthalate, may be impregnated with the copolyesters of the present invention, to form composite films having excellent drape owing to their low tensile modulus (low stiffness). The non-woven fibrous mats may be impregnated by any known techniques, for example, from solvent solutions, by application of a hot polymer melt, by hot-pressing a homogeneous film of the copolyester into a fibrous mat, etc. On the other hand, the copolyesters of this invention may be employed as a top coating for fiber-reinforced polymeric films in which other types of thermoplastic polymers are employed as the binder material, such a top coating serving to increase the resistance of the composition to abrasion. The coating is particularly useful from the standpoint that it has a relatively high leather permeability value. Other uses for films of the copolyesters of the present invention include use as shoe uppers and as a safety-glass interlayer.

I claim:

1. The process which comprises reacting under ester interchange conditions ethylene glycol, an alkyl ester of terephthalic acid wherein the alkyl group contains from 1–7 carbon atoms, an alkyl ester of isophthalic acid wherein the alkyl group contains from 1–7 carbon atoms, and a polyethylene glycol having an average molecular weight within the range of from about 1000 to about 4000 and defined by the formula

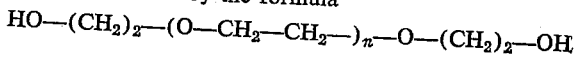

HO—(CH$_2$)$_2$—(O—CH$_2$—CH$_2$—)$_n$—O—(CH$_2$)$_2$—OH wherein $n$ is an integer, said polyethylene glycol comprising from 40%–70% of the total weight of said ester of terephthalic acid, said ester of isophthalic acid, and said polyethylene glycol, said ester of terephthalic acid comprising from 50%–95% of the remainder of said total weight, and said ethylene glycol being present in the proportion of from 1.5 to 5 mols per mol of the mixture of esters of terephthalic and isophthalic acids, whereby to form a mixed ester and polymerizing said mixed ester at a temperature between about 230° to 290° C., and a pressure between 0.05 and 20 millimeters of mercury to form a linear copolyester.

2. The process of claim 1 wherein the ester of terephthalic acid is dimethyl terephthalate and the ester of isophthalic acid is dimethyl isophthalate.

3. A linear copolyester derived by the process of claim 1.

4. The linear copolyester of claim 3 in the form of a self-sustaining film.

5. The linear copolyester of claim 3 in the form of a filament.

References Cited in the file of this patent

UNITED STATES PATENTS

| 2,594,144 | Flory et al. | Apr. 22, 1952 |
| 2,744,087 | Snyder | May 1, 1956 |

FOREIGN PATENTS

| 655,377 | Great Britain | July 18, 1951 |
| 673,066 | Great Britain | June 4, 1952 |
| 682,866 | Great Britain | Nov. 19, 1952 |